(No Model.) 3 Sheets—Sheet 1.

F. H. VAN HOUTEN.
MOLDING MACHINE.

No. 450,789. Patented Apr. 21, 1891.

Witnesses
E. D. Smith
Thomas Durant

Inventor
Frank H. Van Houten
By his Attorneys
Church & Church (No Model.) 3 Sheets—Sheet 3.

F. H. VAN HOUTEN.
MOLDING MACHINE.

No. 450,789. Patented Apr. 21, 1891.

Witnesses
E. L. Smith
Thomas Durant

Inventor
Frank H. Van Houten,
By his Attorneys
Clinch & Clinch

UNITED STATES PATENT OFFICE.

FRANK H. VAN HOUTEN, OF MATTEAWAN, NEW YORK, ASSIGNOR TO CHARLES L. GOEHRING, OF ALLEGHENY, PENNSYLVANIA.

MOLDING-MACHINE.

SPECIFICATION forming part of Letters Patent No. 450,789, dated April 21, 1891.

Application filed May 26, 1890. Serial No. 353,160. (No model.)

*To all whom it may concern:*

Be it known that I, FRANK H. VAN HOUTEN, of Matteawan, in the county of Dutchess and State of New York, have invented certain new and useful Improvements in Molding-Machines; and I do hereby declare the following to be a full, clear, and exact description of the same, reference being had to the accompanying drawings, forming a part of this specification, and to the figures and letters of reference marked thereon.

This invention relates to improvements in that class of wood-working machines described in my prior application, Serial No. 333,419; and it consists generally in the application to or use in connection with such a machine of devices or mechanism for automatically effecting a traverse of the oscillatory reciprocating cutter-head while in action to control the form of the figure; and it further consists in certain novel features of construction and the arrangement of parts, all as hereinafter described, and pointed out in the claims.

Figure 1:
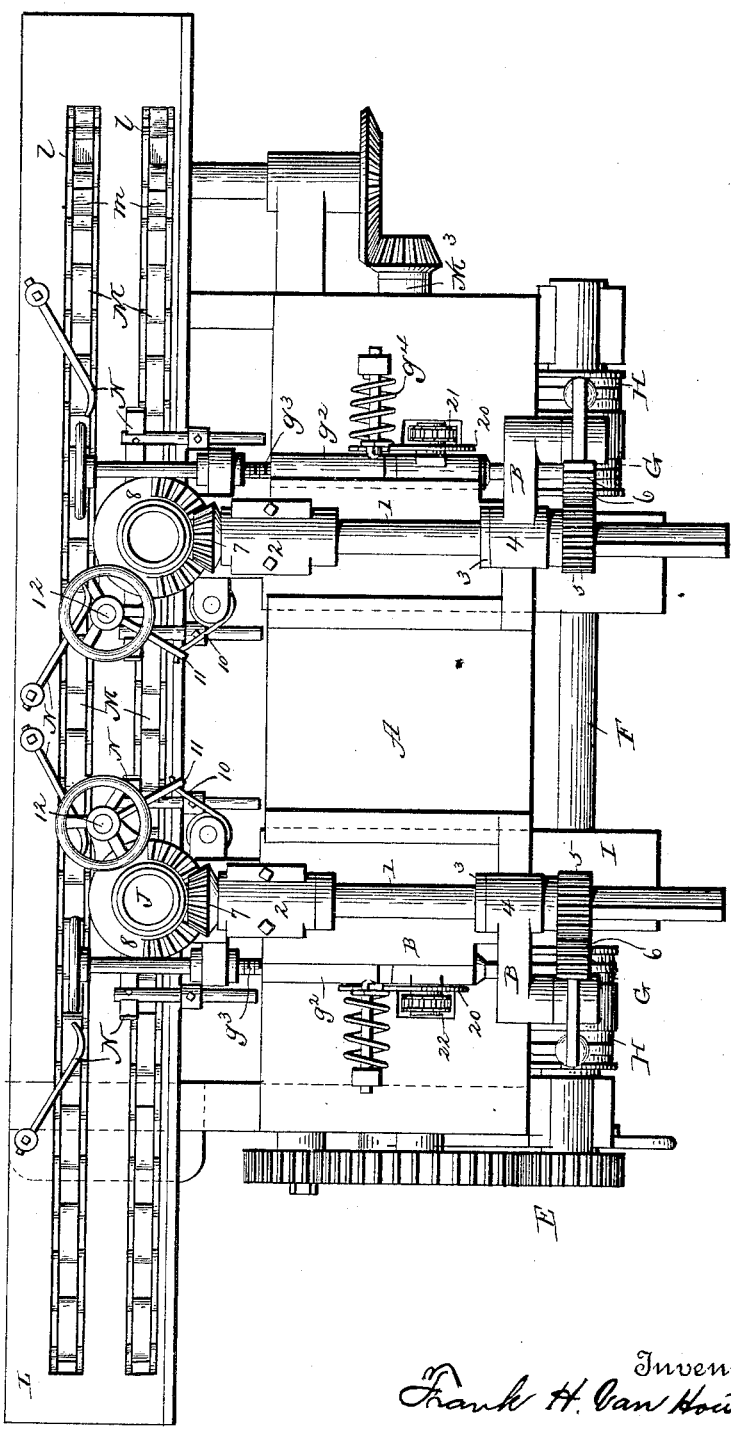
Figure 2:
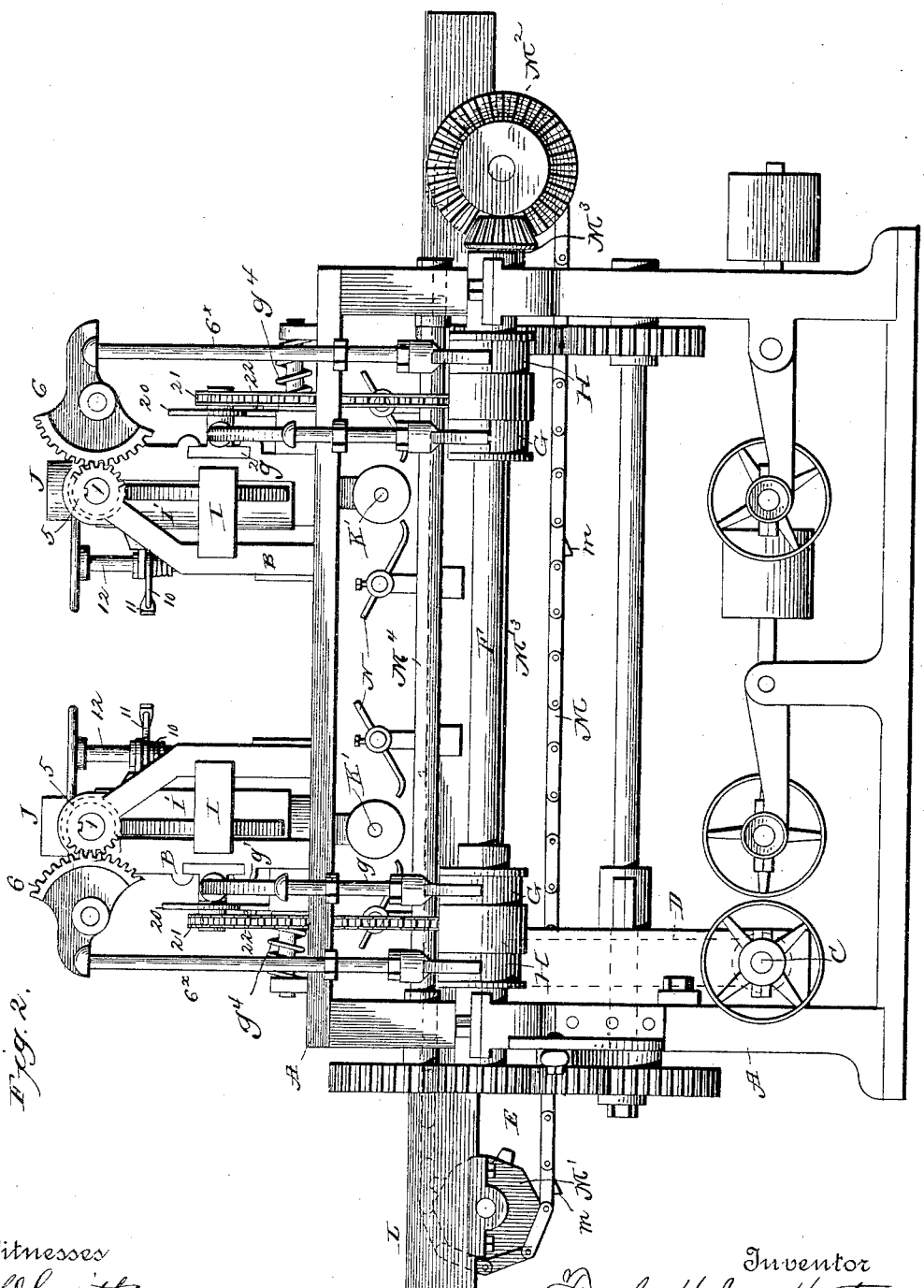
Figure 3:
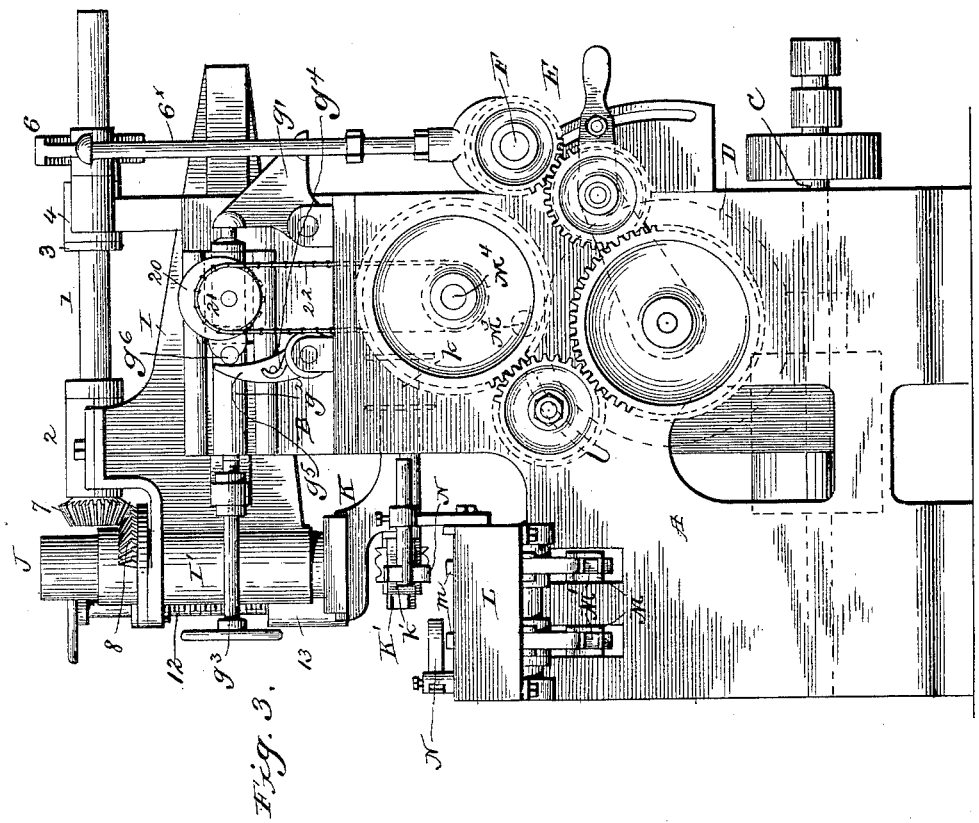

In the drawings, Figure 1 is a top plan view. Fig. 2 is a side elevation, and Fig. 3 an end view, of a machine containing my present improvements.

Similar letters of reference in the several figures indicate the same parts.

The letter A designates the frame of the machine; B, the uprights supporting the cutting mechanism; C, the main driving-shaft; D, worm-gearing; E, a system of change-gears; F, the cam-shaft; G, the cams for controlling the transverse reciprocating movements of the cutter-heads; H, the cams for controlling the oscillatory movements of the cutter-heads; I, the slide or carriage; J, the vertical spindle, stem, or post carrying the arbor-frame and supported in bearings in or on the overhanging portion of the slide; K, the arbor-frame adjustably and removably attached to the lower end of the spindle J and carrying arbor K' with its pulley $k$ and cutter-head $k'$; L, the bed-plate formed or provided with one or more longitudinal slots or openings $l$ for the passage of dogs on the feed-chain; M, the feeding-chain provided with dogs $m$ and passing around pulleys or sprocket-wheels M' M², one of which (M²) is driven, as by gearing, with a shaft M³; and N, suitable presser-bars for sustaining the material in position while traversing the bed-plate under the influence of the feeding mechanism. Although slightly modified in their forms and arrangement, these principal elements are combined and operate substantially in the manner and for the purpose described in my prior application—that is to say, the oscillating and reciprocating motions of the cutter-head, and of both cutter-heads when two are employed, and the advancing movements of the material as effected by the feeding mechanism, have a fixed relation the one to the other, resulting in the production of a continuous series of curves or figures whose shapes and dimensions depend upon the relation of the feed movement to the transverse reciprocations of the cutter-head in time and extent and the forms of the cutting-bits.

In place of a cross-head to support the reciprocating slide or carriage I, the latter is guided in ways on the uprights B and projects above the bed-plate, its overhanging end being formed or provided with a vertical bearing I', in which the spindle or stem J is supported. The reciprocating motions of the slide are produced by cam G, acting through rod $g$, bell-crank lever $g'$, slide or block $g^2$, and an abutment or adjusting-screw $g^3$ on the slide I. A spring $g^4$, operating upon arm $g^5$, engaging a shoulder or projection $g^6$, on slide $g^2$, operates in opposition to the cam to hold the parts retracted.

Provision is made for the vertical adjustment of the cutter and for effecting the oscillations of the latter by the following arrangement of devices: A shaft 1 is supported at one end in a bearing 2 on slide I and passes through a sleeve 3, supported against longitudinal movement in a bearing 4 on the frame. This sleeve carries a gear 5, and is connected to the shaft 1 by a spline or equivalent connection, which will permit longitudinal motion of the shaft within the sleeve, but compels them to rotate together. The gear 5 is engaged by a gear-segment 6, mounted on the frame and receiving motion from cam H, through rod 6ˣ, whereby the shaft 1 is given an oscillating motion, while the slide and shaft 1 are reciprocated under the action of cam G. To the forward end of shaft 1 is secured a bevel-pinion 7, meshing with a gear-segment on a disk or collar 8, surrounding the spindle or stem J. This collar is splined to the stem or otherwise connected, so that both will rotate in unison and at the same time will permit a longitudinal movement of the stem. As thus arranged the cam H operates to move the stem in one direction, and a spring 10, mounted on the slide and engaging a link 11 on the collar, moves the spindle in the opposite direction—that is to say, it holds the parts intermediate the cam and collar retracted or pressed toward the cam. An adjusting-screw 12, mounted upon the collar or a projection therefrom, engages a nut or threaded portion 13 on the spindle and serves to raise and lower the latter within the collar and thus regulate the height of the cutter above the bed-plate.

In order to provide for the convenient removal of the chips, &c., made by the cutter the spindle or stem J is made hollow and suction devices are connected to its upper end for drawing the chips through the center of the spindle.

The machine constructed as described is adapted to produce a great variety of designs or moldings, the figure being composed of a continuous connected series of figures corresponding to the shapes of the operating-cams—that is to say, at each revolution of the cam-shaft a complete figure is produced; but each of the several figures will occupy the same relative position and be formed on a uniform base-line parallel with the line of feed.

It is sometimes desirable to produce the series of figures on curved or irregular lines—as, for example, to produce a series of curves or scallops on a curved or arc-shaped line instead of on a straight line. To accomplish this it becomes necessary to provide either for a lateral movement of the material or of the cutting mechanism while the normal motions of the cutter-head are being performed. In the present instance provision is made for shifting the cutting mechanism bodily without interfering with or disarranging the actuating devices controlling the oscillatory reciprocating movements of the cutter for producing the desired figure. To this end the slide $g^2$, or some equivalent part in the connections between cam G and slide I, is formed in two sections, and a cam 20 of suitable form is mounted upon one section and engages a shoulder upon the other, so that when the cam is shifted or rotated it will in effect lengthen or shorten the connections between the cam and slide I, thereby shifting the position of the spindle J transversely of the bed-plate. Suitable means are provided for shifting the cam while the machine is in operation—that is to say, while the feeding and cutting mechanism are performing their motions. Thus the cam 20 may be provided with a sprocket-wheel 21, engaged by a chain 22, passing around a sprocket-wheel on the shaft $M^4$. By means of an automatic shifting device of this character the scallops or other figures which the machine is set to produce may be formed on curved or irregular lines, the latter being determined by the form, dimensions, or speed of the cam 20 as compared with the speed of the cam-shaft, it being understood that at each revolution of the latter a complete figure is produced.

Let it be assumed that at each revolution of the cam-shaft a complete figure or curve is produced. If the automatic shifting mechanism is not in action, the succeeding figures in the series will all be formed on the same straight base-line. If, however, the automatic shifter is put in operation and adjusted to produce one complete reciprocation to ten revolutions of the cam-shaft, the ten figures will be formed but on a curved base-line.

In the drawings two cutting mechanisms are shown; but a greater or lesser number may be employed, and each may operate to produce a different molding or figure; or two or more may operate upon the same figure, as desired, or one may form the figures on one base-line and the other upon a different base-line. For example, one cutting mechanism may form the figures in a straight line and the other on a curved or irregular base-line, both operating upon the same plank.

The mechanism employed for controlling the movements of the cutter-head independently of or as supplemental to the actuating devices for imparting movement to said cutter, said mechanism being represented in the present instance by cam 2, is denominated a variable shifting device, in that it operates in connection with the actuating devices to shift the cutter, and to vary the direction, degree, or character of the motions produced by the actuating devices, so that the ultimate effect or motion as developed at the cutting-point will vary from the motion derived normally from the actuating devices.

Having thus described my invention, what I claim as new is—

1. In a machine such as described, the combination, with the hollow spindle mounted in bearings, of the rotating cutter-head supported upon the end of said spindle opposite the opening therein, with its axis of rotation lying at an angle to the axis of the spindle, so that the chips thrown off by the cutter may be drawn through the spindle, substantially as described.

2. In a machine such as described, the combination, with the reciprocating slide or carriage provided with bearings, of the oscillating tubular spindle or stem carrying the rotating cutter, substantially as described.

3. In a machine such as described, the combination, with the slide or carriage and the spindle or stem carrying the arbor-frame, of the gear-collar engaging said stem, a shaft supported on the slide and carrying a pinion in engagement with said collar, and a sleeve mounted on the frame and engaging said shaft to rotate or oscillate the latter, and gearing deriving motion from a pattern-cam actuating said sleeve, substantially as described.

4. In a machine such as described, the combination, with the cutter-head mounted to oscillate upon a reciprocating slide or support, and actuating devices controlling the oscillatory and reciprocating motions of the cutter-head, of an automatic variable shifting device engaging the movable support for the cutter, to change or vary the movement produced by the primary actuating mechanism, substantially as described.

5. In a machine such as described, the combination, with a reciprocating slide or carriage and an oscillating cutter mounted thereon, of an automatic shifting mechanism, such as cam 20, arranged in the line of connection between the slide or carriage and the driving-cam for reciprocating the latter, substantially as described.

6. In a machine such as described, the combination, with the slide carrying the cutting mechanism, a cam controlling the movements of said slide, and intermediate connections through which the cam operates upon the slide, of an automatic shifting device—such as a cam—interposed in the line of said connections and operating to extend or shorten them, substantially as described.

7. In a machine such as described, the combination, with the slide or carriage and the oscillating spindle or stem supporting the arbor-frame, of a sliding block formed in sections, one section connected to said slide or carriage and the other to the actuating mechanism, and a cam interposed between the two sections, substantially as described.

8. In a machine such as described, the combination, with the reciprocating slide or carriage and the oscillating spindle or stem supported in said slide and carrying the arbor, of a sectional block through which the actuating devices transmit motion to the slide or carriage, a cam interposed between the sections of the block and connected to the driving mechanism, substantially as described.

9. In a machine such as described, the combination, with a slide or carriage, devices for reciprocating said slide, a spindle or stem mounted upon the slide and carrying the arbor-frame, and devices for oscillating said spindle or stem, of an automatic shifting device, the same comprising a cam operating between the sections of one of the connections through which motion is communicated from the driver or pattern cam to the slide with driving mechanism for said cam, substantially as described.

10. In a machine such as described, the combination, with the slide or carriage, of an independent slide or block formed in sections, one section adjustably connected to said carriage and the other receiving the thrust of the actuating devices, a cam mounted upon one of said sections and bearing against the other, and a sprocket-wheel secured to said cam and connected by a chain to a driving-wheel, substantially as described.

FRANK H. VAN HOUTEN.

Witnesses:
THOMAS DURANT,
A. KELLY.